June 6, 1950 W. H. RICHARDS 2,510,142
PHOTOGRAPHIC PRINTER HAVING AIR FLOW
FILM TAUTENING MECHANISM
Filed March 7, 1947 7 Sheets-Sheet 1

Fig 1

INVENTOR.
WILLIAM H. RICHARDS
BY Wade Krouty
Frederick W. Cottyrman
HIS ATTORNEYS

UNITED STATES PATENT OFFICE 2,510,142

PHOTOGRAPHIC PRINTER HAVING AIR FLOW FILM TAUTENING MECHANISM

William H. Richards, Dayton, Ohio

Application March 7, 1947, Serial No. 733,214

10 Claims. (Cl. 95—75)

(Granted under the act of March 3, 1883, as amended April 30, 1928; 370 O. G. 757)

The invention described herein may be manufactured and used by or for the Government for governmental purposes without payment to me of any royalty thereon.

This invention relates to a photographic printing machine of the continuous type.

An important object of the invention is to provide, in a machine of this kind, mechanism for rapidly making and maintaining perfect and uniform contact between the photographic film, the sensitized print paper and the printing glass.

More specifically the object is to provide means for maintaining a volume of air under a predetermined pressure over the surface of the print paper, the air flowing continuously from the middle of the sheet toward the edges thereby to smooth out the film and print paper while printing is being effected.

Another object is to so control the air flow that no reversal in direction of flow may occur to ruffle the exposed print or interfere with the advancing print paper.

Other objects and advantages will appear as the invention is described in detail and reference is had to the drawing, Wherein.

Like reference characters refer to like parts throughout the drawings.

Figure 1:
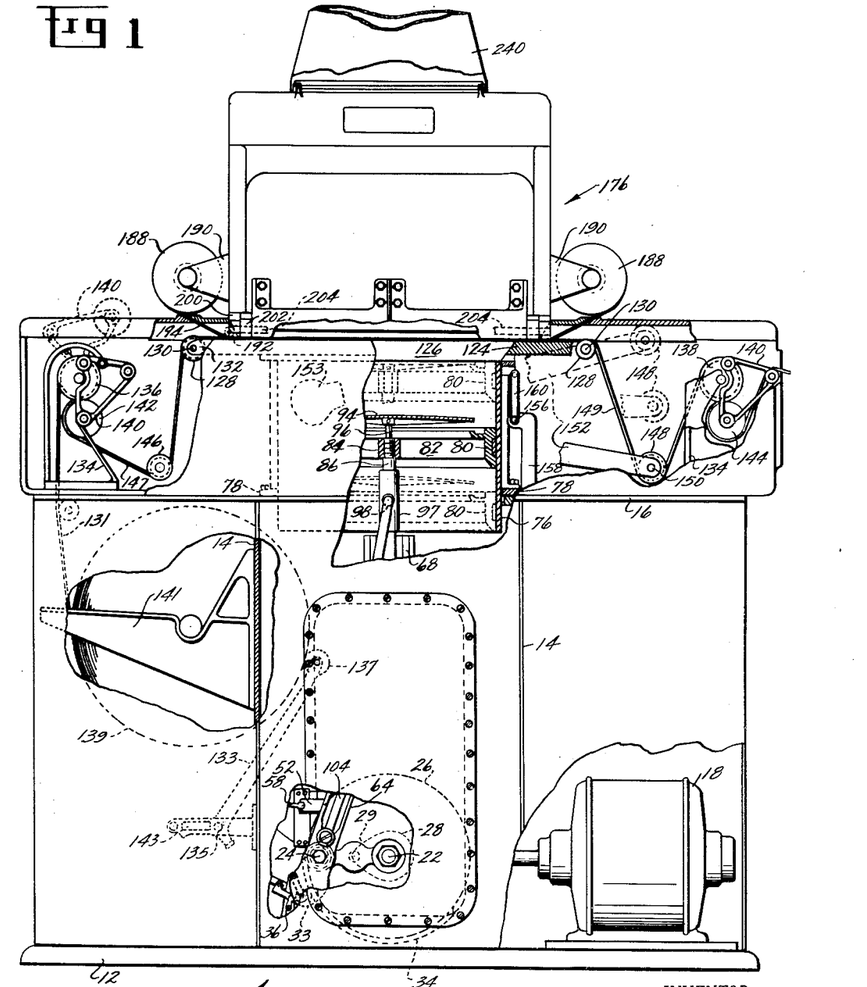
Fig. 1 is a front elevation of the machine with portions of the framework broken away to show the interior construction.

The framework 10 of the machine is composed of three main parts, a base 12, a hollow pedestal 14 and a box-like table 16 extending horizontally across the top of the pedestal (see Fig. 1). The lesser units of the machine are carried by these main parts.

Mounted on the base 12 is an electric motor 18 which drives through a speed reducing gear box 20 (see Figs. 2 and 3) to a relatively low-speed main power shaft 22 which has its axis normal to the motor axis.

Figure 8:
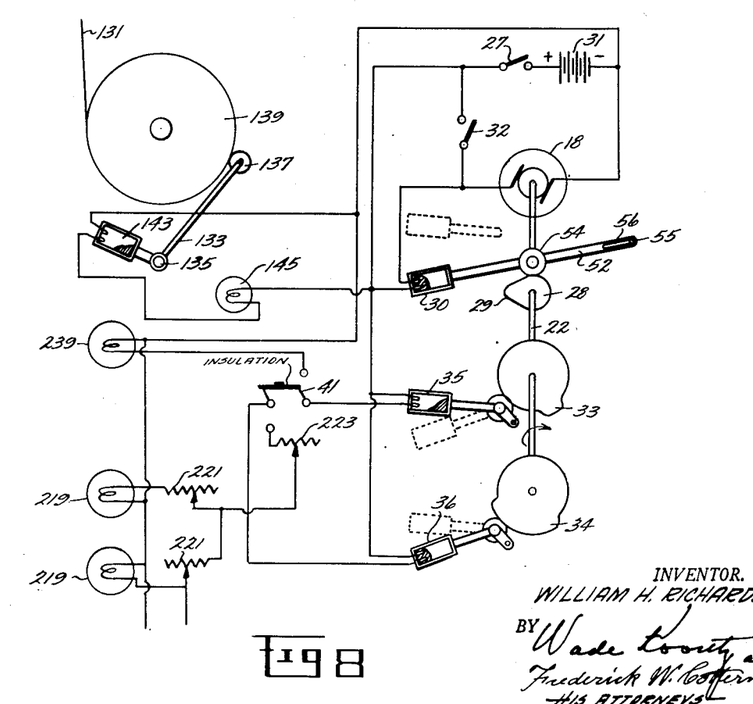
Fig. 8 is a wiring diagram showing the arrangement of the manual and the automatic switches which determine which of the exposure lights are to be used, and the arrangement of the manual and automatic switches which control the starting and stopping of the motor at a preselected point in its cycle.

Freely rotatable on the main power shaft 22 is a crank disc 26 which carries a crank pin 24. A cam 28 having an operating lobe 29 is secured to the crank shaft 22 to rotate in unison therewith. The function of cam 28 is to operate a mercury switch 30 (see Figs. 2 and 8) for connecting a power source 31 to the motor 18, the cam 28 being arranged to open the circuit and stop the motor 18 when the crank disc 26 is at top center. A manual switch 32 controls a parallel circuit from the power source 31 to the motor 18 (see Fig. 8), whereby, when the manual switch 32 is closed, the motor 18 will operate continuously, while if the manual switch 32 is open, the motor will be stopped at top center of the crank disc 26. A master switch 27 is provided to disconnect the entire circuit.

A short cam lobe 33 and a longer cam lobe 34 are formed on the periphery of the crank disc 26 for respectively operating two mercury switches 35 and 36 which control the exposure lamps. A double pole double throw manual switch 41 is provided and electrically connected in the circuit as in Fig. 8, whereby when the switch 41 is thrown in one direction, a circuit will be completed through the mercury switch 35 by the short cam lobe 33, and when the switch 41 is thrown in the other direction, a circuit will be completed through the mercury switch 36 by the long cam lobe 34.

Figure 2:
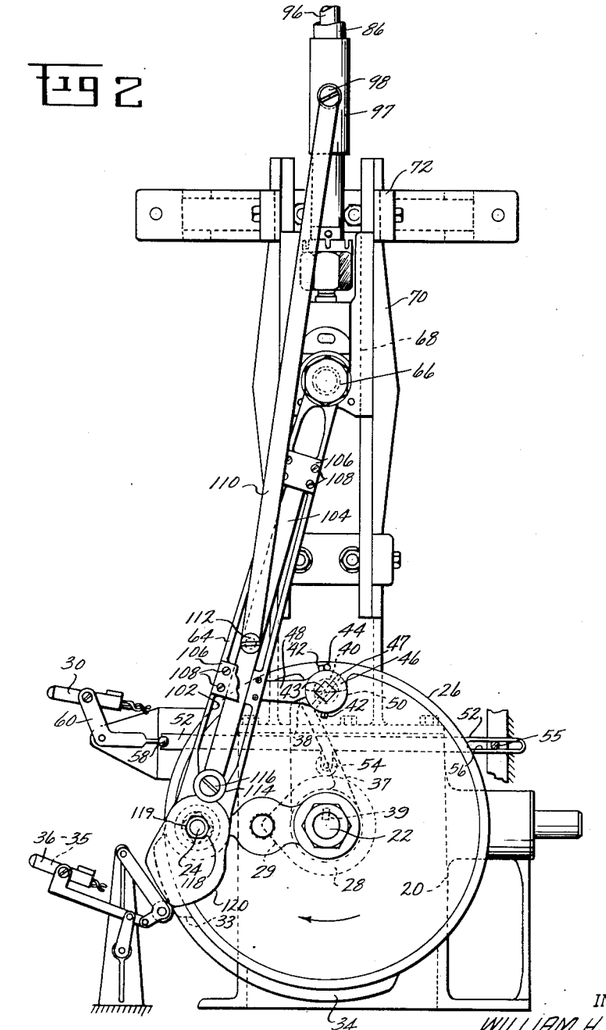
Fig. 2 is a front elevation of the power operated portion of the machine drawn to a larger scale than shown in Fig. 1.
Figures 3, 4A:
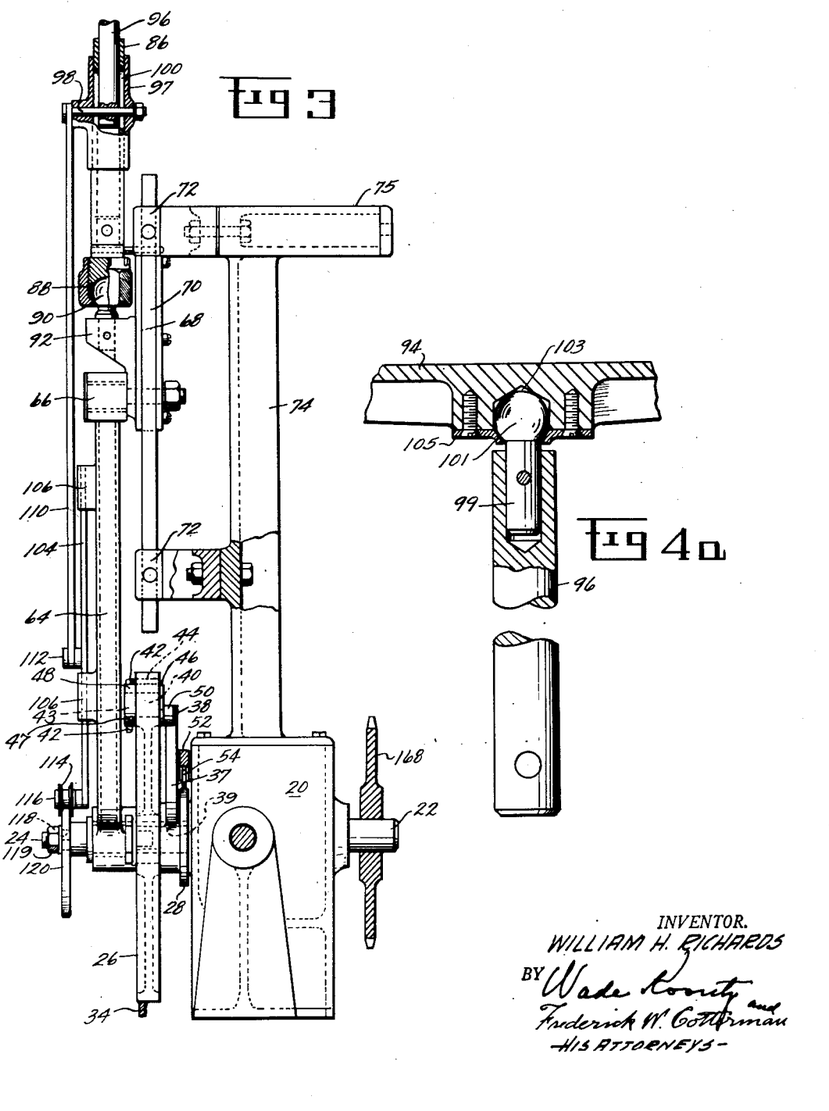
Fig. 3 is a side elevation of Fig. 2 looking from right to left, a small portion being broken away for clearness.
Fig. 4a is an enlarged fragmentary view of the valve operating connection.

A means for drivably connecting the crank disc 26 to the main power shaft 22 or for releasing it therefrom at the option of the operator is provided. A dog 37 having an operating end 38 is drivably secured to the main power shaft 22 by a key 39. A stub shaft 40 has rotative bearing in the crank disc 26, the forward end being squared as at 43 to receive a handle 48 which is additionally held on the shaft by a pin 47, the rotation of the shaft being limited to a half turn by pins 42 in the hub of the handle 48 engaging a pin 44 in the crank disc 26. A hub 46 on the rear end of the shaft 40 may be an integral part of the shaft. Hub 46 is substantially half cut away so as to leave a lug 50, whereby, when the handle 48 points in the direction of rotation of the main power shaft 22, the operating end 38 of the dog 37 will pass the hub 46 without moving it, but when the handle 48 is made to point oppositely, as shown in Figs. 2 and 3, the operating end 38 will engage the lug 50 and the crank disc 26 will be rotated in unison with the main power shaft 22.

As a means for operating the mercury switch 30 for stopping the motor 18 when the crank disc is on top center, an arm 52 carries a roller 54 which rests on the outer surface of the cam 28. The one end of the arm 52 is supported by a pin 55 in a slot 56, while the other end has a ball and socket connection 58 with the switch operating lever 60 of the mercury switch 30. When the operating lobe 29 of the cam 26 reaches top center, i. e., ninety degrees clockwise from the position shown, the switch 30 will be in the off position. If the manual switch 32 (see Fig. 3) is open when the operating lobe 29 reaches top center, the motor 18 will stop.

The crank pin 24 is fixed in the crank disc 26, and the lower or crank-bearing end of a main connecting rod 64 is runningly fitted thereto. The upper or wrist pin bearing end of the main connecting rod 64 is runningly fitted over a wrist pin 66 which is carried in a cross head 68 which is slidable vertically in the cross head guides 70.

Cross head guides 70 are carried by brackets 72 which are in turn supported on a column 74 which extends upward from the top of the gear box 20 for which it forms a closure and rearward as at 75 to the back wall of the pedestal 14 to which it may be bolted or secured in any suitable manner.

A cylinder 76 has a flange 78 (see Fig. 1) by which it is secured to the top of the pedestal 14 within the hollow table 16. A piston 80 is slidably fitted into the cylinder 76, both cylinder and piston being open top and bottom, the piston, however, having a series of spokes 82 extending inwardly from its opening to a central hub 84. A tubular piston rod 86 has its upper end threadedly secured in the central hub 84 (see Fig. 1), the lower end being provided with a ball socket 88 (see Fig. 3) which adjustably surrounds a ball 90 carried on a bracket 92 extending laterally from the cross head 68, whereby rotation of the crank disc 26 moves the piston 80 up and down.

A large disc valve 94 concentrically covers the upper open side of the piston 80. Valve 94 has a stem 96 (see Fig. 4a) which extends downwardly into the tubular member 86 to which it is slidably fitted. An auxiliary cross head 97 which is slidable on the tubular member 86 carries a small wrist pin 98 which extends transversely through the valve stem 96, the tubular member 86 being provided with a slot 100 (see Fig. 3) whereby the valve stem 96 may have relative movement with respect to the tubular member 86. The upper end of the valve stem 96 is apertured for the stem 99 of a ball 101 which is held in a recess 103 in the valve 94 by a plate 105, whereby the valve 94 is self-aligning for contact with its seat on the top of the piston 80.

The front side of the main connecting rod 64 is channeled as at 102, and a sliding bar 104 of rectangular cross section is slidably retained in guide portions of the channel by plates 106 held by screws 108. An auxiliary connecting rod 110 has the lower end hinged by the screw stud 112 to the sliding bar 104, the upper end being pivoted on the small wrist pin 98. The sliding bar 104 has a small roller 114 rotatable on a pin 116 in the lower end of the bar.

Near the forward end the crank pin 24 is squared as at 118, and a cam 120 having a square opening is press fitted over the square 118 of the crank pin and additionally held by the nut 119, whereby the cam 120 may not rotate with respect to the crank disc 26 but will be carried around by the crank pin as the crank disc revolves about the center of the main power shaft 22. At a quarter turn of the crank disc 26 clockwise past top center, the high point of the cam 120 will be directly under the roller 114, whereby the sliding bar 104 will be at the uppermost position with respect to the main connecting rod 64, whereby the disc valve 94 will be held at maximum open position by the auxiliary connecting rod 110. When the crank disc 26 has returned the crank pin 24 to bottom center, the roller 114 will again be on the low part of the cam 120 where it will dwell while the crank disc 26 turns further clockwise to move the crank pin 24 from bottom center to top center.

The outer working surface of the cam 120 is so formed that the disc valve 94 opens rapidly as soon as the piston 80 starts on the downward stroke but is closed just as the piston reaches bottom center and remains closed until the piston returns to top center.

Figure 4:
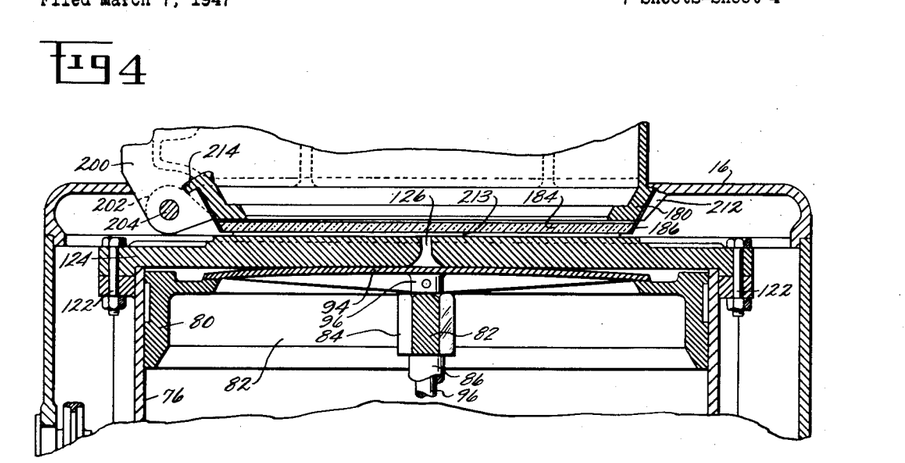
Fig. 4 is an enlarged fragmentary axial section through the cylinder, piston, valve, platen, printing plate and printing plate frame.

Mounted on the upper open side of the cylinder 76 and fastened thereto by bolts 122 (see Fig. 4) is a platen 124 which completely closes the top of the cylinder except for a slot 126 which extends through the platen lengthwise thereof, i. e., in the direction which the print paper 131 moves in passing through the machine. Rollers 128 (see Fig. 1) are rotatable on rods 130 supported in ears 132 formed on the ends of the platen. Rollers 128 carry the print paper over the ends of the platen.

Figure 4B:
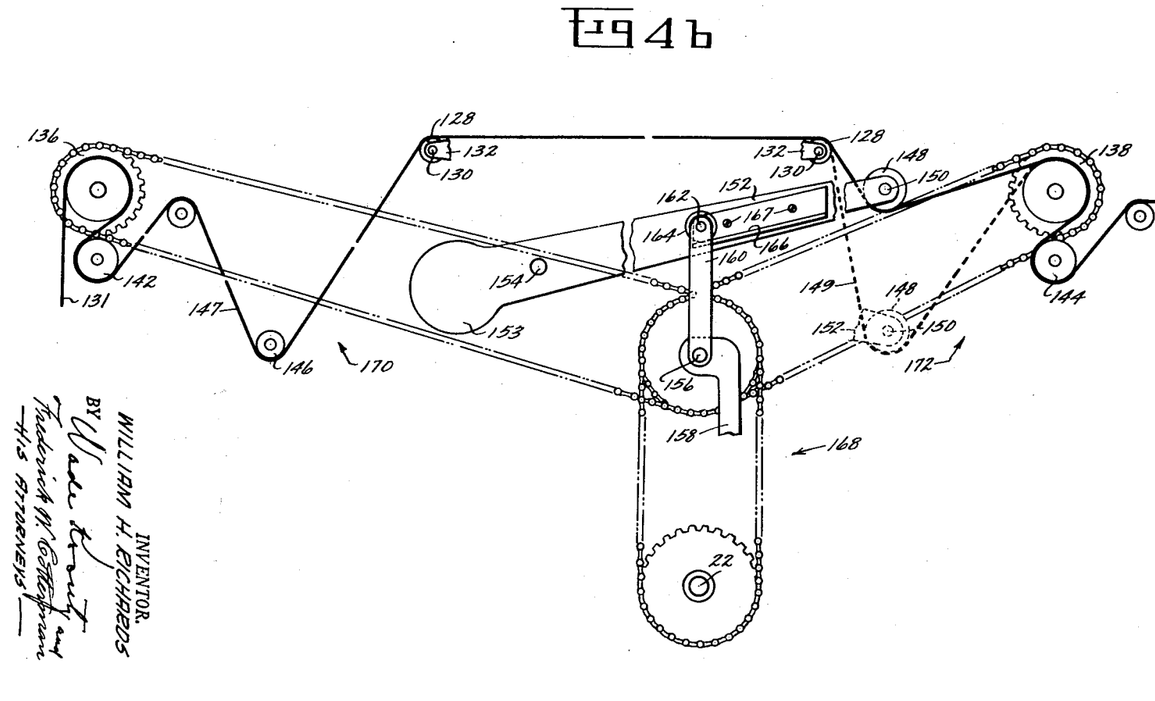
Fig. 4b is a schematic view of the print paper feed mechanism.

Brackets 134, fast on the bottom of the hollow table 16, carry driving rollers 136 and 138 (see Figs. 1 and 4b) which respectively move the print paper into and out of the machine. The paper supply spool 139 is carried on a bracket 141 fast to the side of the pedestal 14. A bellcrank 133 pivoted at 135 has a roller 137 at the outer end of one arm which rests on the periphery of the paper roll 139, and a mercury switch 143 at the outer end of the other arm which tilts to the "on" position to light a signal light 145 (see Fig. 3) when the roll has decreased to a predetermined diameter. Swinging brackets 140 carry paper tension rollers 142 and 144. A gravity operated take-up roller 146 is provided at the input end of the machine to allow variation in the loop 147, and a power operated take-up roller 148 at the output end to allow variation in the loop 149.

Roller 148 rotates on a shaft 150 which is carried on the free end of an arm 152, the other end of the arm having a counterbalancing weight 153 (see Fig. 4b) and, intermediate the ends, having bearing on a stud 154 supported by the hollow table 16. A countershaft 156 has rotative bearing in brackets 158. A crank 160, having a stud 162 and roller 164 at the free end, is fast on the countershaft 156. An angle bracket 166 has one side attached to the side of the arm 152 by screws 167 in such a position that during the interval that the crank 160 rotates clockwise one half turn from top center to bottom center, the roller 164 engages the laterally projecting part of the angle bracket and moves it and the arm 152 downward, thereby drawing the print paper downward with the roller 148 into a loop 149 which, together with continuous rotation of the power feed-out roller 138 moves the exposed section of print paper off the platen and draws a new section into its place for the next exposure. Since the power feed-in roller 136 does not bring the paper in fast enough, the loop 147 shortens by raising the weighted take-up roller 146. At down center the small roller 164 rides off the angle bracket 166 whereby the paper power feed-out roller 138 takes up the loop 149 while the paper on the platen remains stationary for the next exposure.

A one to one ratio chain-and-sprocket drive 168 connects the countershaft 156 to the main power shaft 22 and similar chain-and-sprocket drives 170 and 172 connect the countershaft 156 to the power feed-in and power feed-out rollers 136 and 138 respectively.

Figure 7:
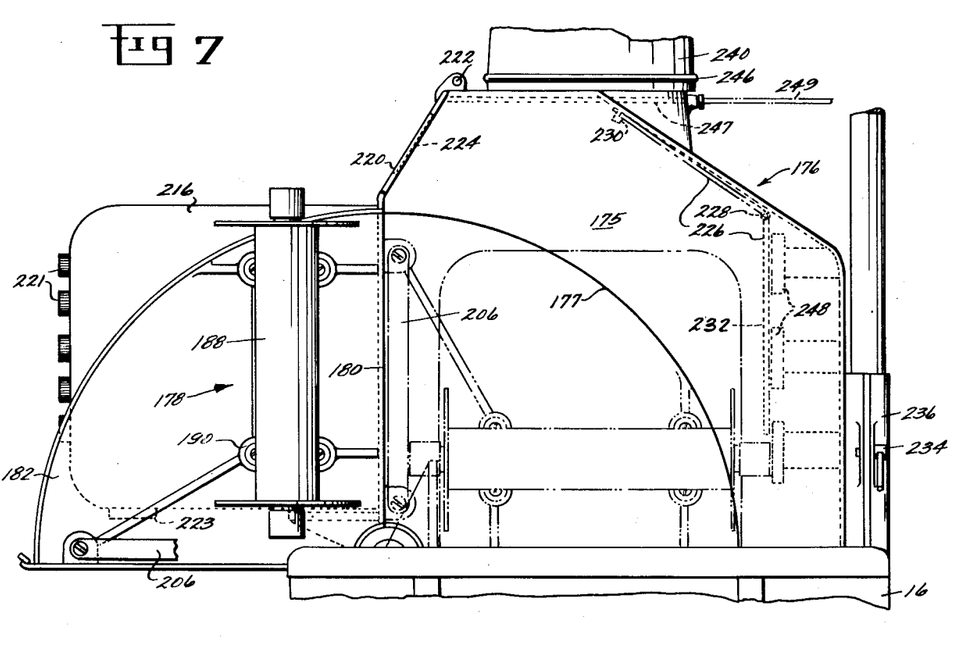
Fig. 7 is another side elevation of the exposure housing with its associated parts in a different position.

Mounted on top of the table 16 and secured thereto by screws 174 is an exposure housing 176, the front of which is open and the end walls 175 of which have the underside 177 overhanging toward the front in the form of the half of an arch, the front and so much of the ends being open for the insertion and withdrawal of the film carrier 178. The film carrier 178 consists of a bottom in the form of a frame 180 (see Fig. 4) with upwardly extending end walls 182, the upper edges of which are of convex contour and shaped to correspond to the overhanging half arch in the end walls of the exposure housing 176. The film supporting glass 184 is held in the frame 180 by clamping strips 186. Spools 188 for the film 194 (see Fig. 1) are rotatably supported on brackets 190 carried by the end walls 182 of the film carrier 178. Small rollers 192 (see Fig. 5a) are positioned where the film 194 rides off the end of the film supporting glass or printing plate 184, the shafts 196 of the rollers 192 having rotative bearing in hinge ears 198 which are formed by bending a portion of the glass clamping strips 186 as shown. A pair of hinge ears 200 on the carrier frame 180 (see Fig. 4) cooperate with a pair of hinge ears 202 on the platen 124 in supporting a hinge rod 204 upon which the film carrier 178 may be rocked inward as in Fig. 5 to place the film 194 and the film supporting glass or printing plate 184 down over the platen 124 for exposure, or rocked outward as in Fig. 7 to place the film 194 and glass 184 in a vertical plane for inspection and dodging of the film. Handles 206, one on each end wall 182 are provided for rocking the film carrier to one or the other of its positions. In order to provide an adequate light seal where the convex upper edge of the film carrier end walls 182 join the arcuate underside 177 of the end walls of the exposure housing 176, the housing wall is flanged inward as at 208 and the carrier wall is flanged outward as at 210 (see Fig. 6). Stops 212 on the film carrier frame 180 engage corresponding stops on the table 16 outside the film width to delimit the thickness of the space 213 through which the film and the print paper must pass. The space 213 should be finally determined by experiment but may preferably be three or four one thousandths of an inch greater than the combined thickness of the print paper and film.

Stops 214 on the hinge ears 200 limit the extent to which the film carrier 178 may be withdrawn from the exposure housing 176 so as to position the film and glass in the vertical position.

The main lamp housing 216 is open at the bottom only, the opening being provided with a narrow flange 218 which extends completely around it and which seals against light leakage between the upper surface of the glass frame 180 and the main lamp housing 216 when the main lamp housing is swung inward to the exposure position, and seals against light leakage between the main lamp housing 216, the film carrier 178, and the exposure housing 176 when the main lamp housing 216 is swung outward to the dodging position. A series of lamps 219 within the main lamp housing 216 (see Figs. 5 and 8) each is provided with an individual rheostat 221. A single reactor 223 is also placed in the light circuit to control the overall illumination after it has been brought to uniform density over the entire film surface by controlling the individual rheostats. A frame 220 is hinged to the exposure housing 176 at 222. Frame 220 carries a viewing glass 224. A mirror 226 is hinged to the exposure housing at 228 and may be swung either upward and latched in that position by the latch 230 or downward as at 232 when it is to be used to view the film 194.

Extending upward from the rear of the exposure housing 176 is a clamp 234 which adjustably clamps a tubular support 236 for supporting a holder 238 for a photo-flash light 239. A circular curtain 240 of black cloth connects the photo-flash light holder to an annular rib 242 in the top of the exposure housing 176. The annular rib 242 is provided with a groove 244 whereby a spring ring 246 may retain the curtain 240 in place subject to removal for removing the bulb 239 in the flashlight holder 238. A slot 247 extends through the exposure housing 176 below the annular rib 242 for insertion of a filter 249 when using the photo-flash light 239.

A series of photoelectric cells 248 are carried on the rear wall on the inside of the exposure housing 176. When the main lamp housing 216 and the film carrier 178 are swung out to the dodging position as in Fig. 7, and the mirror 226 is raised, these cells measure the intensity of the light after it has passed through the film. The intensity of the light received by the photoelectric cells is measured on an ammeter 225, Fig. 5, and correction to the known light requirement is made with the reactor 223.

The operation of the machine is as follows:

A spool 139 of print paper 131 is placed on the bracket 141 and threaded through the machine as shown. A spool 188 of negative film 194 is placed in position as shown and the spools turned manually until the desired negative appears in the exposure housing 176. The main lamp housing 216 and the film carrier 178 are tilted outward toward the operator as in Fig. 7, and the mirror 226 is in the lowered position 232. The selected negative is now ready to be inspected for dodging and for adjusting the lamp current which, when passed through the film, will provide the desired illumination on the paper being used.

The rheostats 221 of all of the lights 219 in the main lamp housing 216 are now turned on full and the selected negative is viewed by looking through the glass 224 into the mirror 226 where the reflection of the negative will appear. Dodging is now resorted to, that is, where spots in the film seem to be too brightly illuminated the lamps over those spots are properly dimmed until even illumination is provided throughout the negative. The mirror 226 is now raised to its upper position whereupon the photoelectric cells 248 receive the light which the negative has permitted to pass and register its intensity on the ammeter. The reactor 223 is now adjusted until the ammeter indicates the illumination dictated by experience to be correct for the print paper being used. The film carrier 178 and the main lamp housing 216 are then tilted inward away from the operator into the exposure position as indicated in phantom in Fig. 7 and the motor started by turning on the manual switch 32 whereby each turn of the crank disc 26 will expose a new section of print paper to the negative and coincidentally light the lamps in the lamp housing 216 until the required number of prints are made.

Figures 5, 5A, 6:
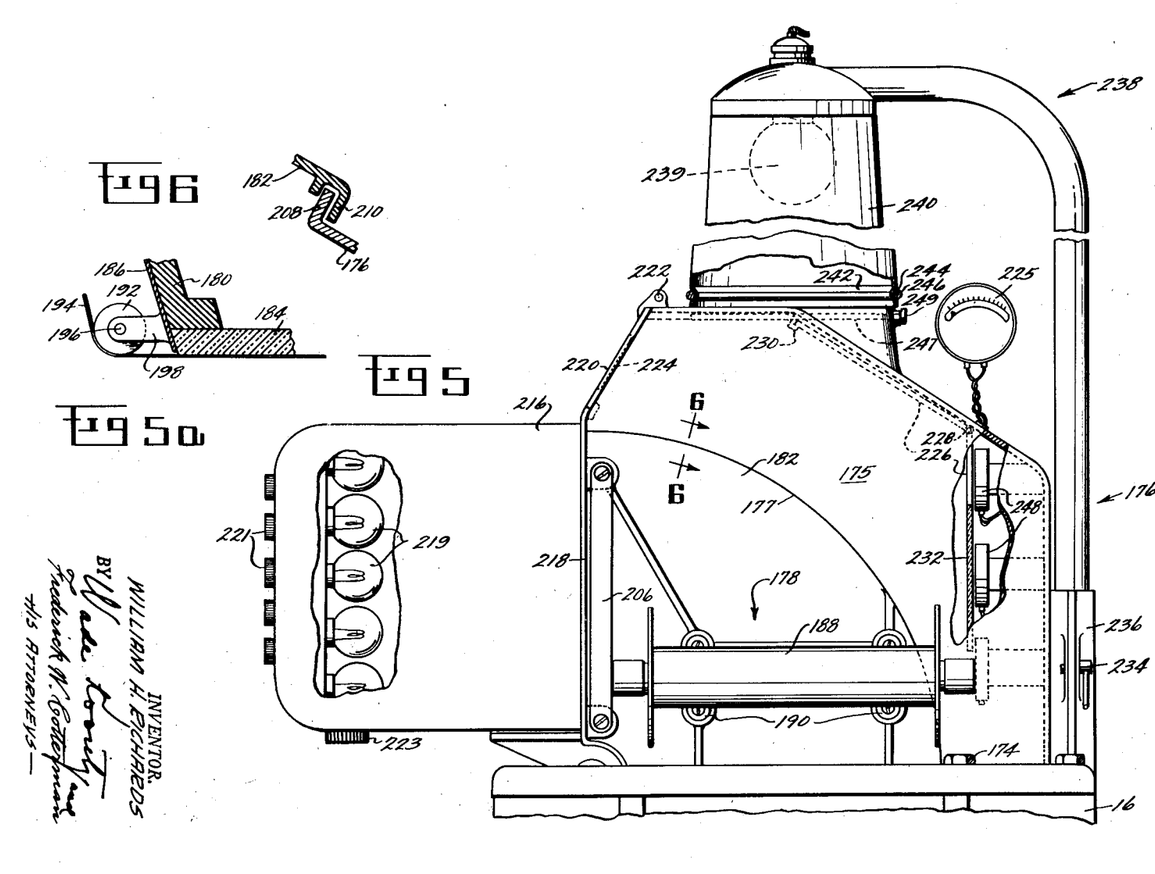
Fig. 5 is a side elevation of the exposure housing and its associated parts.
Fig. 5a is an enlarged fragmentary view of the film guide roller.
Fig. 6 is a fragmentary section taken at 6—6 of Fig. 5 showing how a light seal is maintained in the exposure housing.

If, upon viewing the negative, it is found that no dodging is required, the exposure may be made with the photo-flash light 239 preferably by first turning all of the rheostats 221 in the main lamp housing 216 on full, measuring with an ammeter the intensity of the light after it has passed through the film 194, subtracting the measured intensity from the known intensity requirement to determine the excess light, then selecting and placing a filter 249 having light reducing capacity equal to the excess light to reduce the light reaching the paper to the required amount. When the flash light is thus used, the main lamp housing 216 remains tilted toward the operator outside the exposure housing 176, the film carrier is swung inward to the exposure position, and the mirror 226 is in the down position 232 all as seen in Fig. 5. The photo-flash light provides a point light source which is preferable where dodging is not necessary.

Whether the main lamp housing or the flash light is employed, automatic repetition of exposures will continue as long as the manual switch 32 remains closed.

As the piston 80 starts on the up stroke, the disc valve 94 closes, whereupon a steady flow of air is forced out through the slot 126 of the platen 124, and laterally through the space 213 between the film 194, print paper 131, and the platen 124 during the entire up stroke thereby smoothing out the print paper 131 and film 194 in all directions from the center but particularly crosswise of the film where the tension rollers have very little smoothing out effect.

During each upstroke of the piston 80, one or the other of the cam lobes 33 or 34 acts on a mercury switch 35 or 36 to energize either the flash light 239 or the bank of lights 219 in the lamp housing 216 whichever has been selected by the manual switch 41.

When the piston 80 begins its down stroke the valve 94 starts to open, whereby the piston may descend without creating suction backwardly through the slot 126 of the platen 124, which might not only ruffle the print paper but might interfere with its being drawn forward by the arm 152 and roller 148 which also operate on the down stroke.

When the desired number of exposures have been made, the manual switch 32 should be opened. This may be accomplished manually or by means of a conventional counting mechanism. In either event the piston 80 will come to a stop the next time it reaches top center.

If in preparing the machine for operation, it becomes desirable to move any part of the print paper through the machine without having the piston move up and down, this may be accomplished by throwing the handle 48 around 180 degrees, whereupon the paper feed mechanism will continue to function without operating the piston or exposure lights.

Having described an embodiment of my invention,

I claim:

1. In a photographic printing machine, an exposure light, a transparent printing plate spaced from said light, a pair of film spools one at each end of said printing plate positioned for tautening a section of film across that side of said printing plate opposite said light, a platen slightly spaced apart from said printing plate on the side opposite said light, the interfacing surfaces of said plate and platen being parallel planes, spaced apart a distance slightly greater than the combined thickness of the film and the paper, roller means at the ends of said platen for alternately moving and tautening a length of sensitized print paper in the space between said plate and platen, an elongated passageway through said platen positioned medially and extending lengthwise thereof in the direction of movement of said paper, means to flash said exposure light, and means to coincidentally force a substantially steady flow of air through the passageway in said platen against said section of paper and moving it transversely of said section of paper and of said film from the middle to and beyond the edges, whereby the film and paper are tautened transversely of their length.

2. In a photographic printer, a transparent printing plate, exposure light means on one side of said printing plate, means to hold a film against the other side of said printing plate, a platen parallel to and slightly spaced from said printing plate, roller means at the ends of the platen for alternately moving and tautening a section of a roll of sensitized print paper in the space between said platen and said film, said space being slightly greater than the thickness of the film and paper taken together, an elongated passageway through said platen medially positioned and extending lengthwise thereof in the direction of movement of said paper, power means to flash said exposure light and coincidentally force a substantially steady flow of air through said passageway in said platen and moving it transversely of said paper from the middle to and beyond the edges, and sequentially operating said roller means to move said paper lengthwise thereof to an unexposed portion of the roll.

3. In a photographic printer, a transparent printing plate, an exposure lamp on one side of said printing plate, means to hold a film against the other side of said printing plate, a platen parallel to and having one side slightly spaced from said printing plate, roller means at the end of the platen for alternately moving and tautening a section of a roll of sensitized print paper in the space between said platen and said film, said space being slightly greater than the combined thickness of said film and said paper, an opening in the form of an elongated passageway through said platen medially positioned and extending lengthwise thereof in the direction of movement of said paper, a cylinder on the other side of said platen encircling said passageway, a piston in said cylinder, and power operated means to simultaneously flash said exposure lamp and move said piston in said cylinder toward said slot, to thereby force a substantially continuous flow of air from the middle outward between said platen and said paper whereby said paper is smoothed sidewise from the middle outward and held firmly against said film.

4. In a photographic printer, a transparent printing plate, an exposure lamp on one side of said printing plate, means to hold a film against the other side of said printing plate, a platen parallel to and having one side slightly spaced from said printing plate, paper control means beyond the ends of said platen constructed and arranged for alternately tautening a section of a roll of sensitized print paper in the space between said platen and said film then moving it therethrough, said space being slightly greater than the combined thickness of said film and said paper, an elongated passageway through said platen medially positioned and extending lengthwise thereof in the direction of movement of said paper, a cylinder fast on the other side of said platen encircling said passageway thereby making of said passageway a port in the end of said cylinder, a piston in said cylinder movable toward and away from said port, power operated means to move said piston in a direction away from said platen and coincidentally operate said paper control means to move said paper to a new position, and to operate said paper control means to tauten said paper and move said piston toward said platen, whereby a puff of air is discharged through said slot into and through said space whereby said paper is smoothed from the middle outward toward the edges and held firmly against the film during the exposure period.

5. In a photographic printer, the combination of associated elements comprising, a transparent printing plate, exposure light means spaced apart from one side of said printing plate, means to hold a film against the other side of said printing plate, a platen parallel to and having one side slightly spaced from said printing plate, paper control means beyond the ends of said platen adapted for alternately endwise tautening a section of a roll of sensitized print paper in the space between said platen and said film then moving it therethrough, said space being slightly greater than the combined thickness of said film and said paper, a passageway in the form of an elongated slot through said platen medially positioned and extending lengthwise thereof in the direction of movement of said paper, a cylinder secured pressure tight to the other side of said platen encircling said passageway thereby making said passageway a port in said cylinder, a piston in said cylinder movable toward and away from the port in said platen, a connecting rod having one end connected to said piston, a crank operatively connected to the other end of said connecting rod, power means for rotating said crank to operate said piston whereby, when said piston moves in said cylinder toward said port a continuous flow of air is forced through said port and said space to thereby crosswise tauten said print paper, and means operated by said power means for lighting said exposure light means on the compression stroke of said piston and for operating said paper control means to advance said paper on the suction stroke of said piston.

6. An automatic photographic printer, which comprises a series of associated elements including a transparent printing plate, exposure light means spaced apart from one side of said printing plate, means to hold a photographic film against the other side of said printing plate, a platen parallel to and having one side slightly spaced from said printing plate, paper control means beyond the ends of said platen adapted for alternately tautening a section of a roll of sensitized print paper in the space between said platen and said film then moving it therethrough, said space being slightly greater than the combined thickness of said film and said paper, a passageway in the form of an elongated slot through said platen medially positioned and extending lengthwise thereof in the direction of movement of said paper, a cylinder secured pressure tight to the other side of said platen encompassing said passageway thereby making of said passageway a port in said cylinder, a piston in said cylinder movable toward and away from the port in said platen, a crank, a crank pin, a connecting rod connecting said crank pin to said piston, power means to rotate said crank to move said piston toward and away from the port in said platen movement of said piston toward said platen causing a continuous flow of air through said port and said space to thereby tauten said paper crosswise of the direction of print paper movement, power actuated mechanism to flash said light coincidentally with the compression stroke of said piston and to operate said paper control means to move said paper coincidentally with the suction stroke of said piston.

7. An automatic photographic printer, which comprises, in combination, a series of associated elements including a transparent printing plate, exposure light means spaced apart from one side of said printing plate, means to hold a photographic film against the other side of said printing plate, a platen parallel to and having one side slightly spaced from said printing plate, paper control means beyond the ends of said platen adapted for alternately tautening a section of a roll of sensitized print paper in the space between said platen and said film, then moving it therethrough, said space being slightly greater than the combined thickness of said film and said paper, a passageway in the form of an elongated slot through said platen medially positioned and extending lengthwise thereof in the direction of movement of said paper, a cylinder secured pressure tight to the other side of said platen with its bore encircling said passageway whereby said passageway becomes a port in said cylinder, a piston in the bore of said cylinder movable toward and away from the port in said platen movement of said piston toward said port causing a continuous flow of air from said cylinder through said port and through said space to the atmosphere, whereby said print paper is tautened crosswise of its movement, opposite ends of said piston being connected by an opening, valve means to close said opening, valve closing means associated with said valve means for causing said valve to close on the compression stroke of said piston and to open on the suction stroke, and electric power driven crank mechanism, a connecting rod joining said crank mechanism to said piston, power connection on said crank mechanism for flashing said exposure light means on the compression stroke of the piston, for operating said paper control means to advance said paper on the suction stroke of said piston, and for opening an electric switch to disconnect said electric power at top center of the piston.

8. An automatic photographic printer, which comprises, in combination, a transparent printing plate, exposure light means spaced apart from one side of said printing plate, means to hold a photographic film against the other side of said printing plate, a platen parallel to and having one side slightly spaced from said printing plate, paper control means beyond the ends of said platen adapted for alternately tautening a section of a roll of sensitized print paper in the space between said platen and said film, then moving it therethrough, said space being slightly greater than the combined thickness of said film and said paper, a passageway in the form of an elongated slot through said platen medially positioned and extending lengthwise thereof in the direction of movement of said paper, a cylinder secured pressure tight to he other side of said platen the bore of said cylinder encircling said passageway whereby said passageway becomes a port in said cylinder, a piston in said cylinder movable toward and away from the port in said platen adapted, when said piston moves toward said port to cause a continuous flow of air to pass through said port and said space to thereby tauten said print paper crosswise of the direction of its travel, opposite sides of said piston being connected by an opening, valve means to close said opening, an electric power driven crank mechanism, a connecting rod joining said crank mechanism to said piston, power connections on said crank mechanism for causing said valve to close on the compression stroke of said piston and to open on the suction stroke, for flashing said exposure light means on the compression stroke, for operating said paper control means to advance said paper on the suction stroke, and for opening an electric switch to disconnect said electric power at top center.

9. A continuous photographic printer, which comprises, in combination, a transparent printing plate, exposure light means spaced apart from one side of said printing plate, means to hold a photographic film against the other side of said printing plate, a platen parallel to and having one side slightly spaced from said printing plate, paper control means beyond the ends of said platen adapted for alternately tautening a section of a roll of sensitized print paper in the space between said platen and said film, then moving it therethrough, said space being slightly greater than the combined thickness of said film and said paper, a passageway in the form of an elongated slot through said platen medially positioned and extending lengthwise thereof in the direction of movement of said paper, a cylinder secured pressure tight to the other side of said platen encircling said passageway thereby forming of said passageway a port for said cylinder, a piston in the slot in said cylinder movable toward and away from said platen adapted, when said piston moves toward said port to cause a continuous flow of air through said port and laterally through said space to thereby tauten said print paper crosswise of its movement, opposite sides of said piston being connected by an opening, valve means to close said opening, an electric power driven crank mechanism, a connecting rod joining said crank mechanism to said piston, cams operated by said crank mechanism for closing said valve and flashing said exposure light means on the compression stroke of the piston, for opening said valve and operating said paper control means to advance said paper on the suction stroke of said piston, and for opening an electric switch to disconnect said electric power at top center of the piston.

10. A continuous photographic printer, which comprises, in combination, a transparent printing plate, exposure light means spaced apart from one side of said printing plate, means to hold a photographic film against the other side of said printing plate, a platen parallel to and having one side slightly spaced from said printing plate, paper control means beyond the ends of said platen adapted for alternately tautening a section of a roll of sensitized print paper in the space between said platen and said film, then moving it therethrough, said space being slightly greater than the combined thickness of said film and said paper, a passageway in the form of an elongated slot through said platen medially positioned and extending lengthwise thereof in the direction of movement of said paper, a cylinder secured pressure tight to the other side of said platen the bore of said cylinder encircling said passageway whereby said passageway forms a port for said cylinder, a piston in said cylinder movable toward and away from the slot in said platen, adapted, when said piston moves toward said port, to provide a continuous flow of air through said port and through said space to crosswise tauten said print paper, opposite sides of said piston being connected by an opening, valve means to close said opening, an electric power source, a crank mechanism adapted to be driven by said power source, a connecting rod joining said crank mechanism to said piston, cams operated by said crank mechanism for closing said valve and flashing said exposure light means on the compression stroke of the piston, for opening said valve and operating said paper control means to advance said paper on the suction stroke of said piston, and for opening an electric switch to disconnect said electric power at top center of the piston, and manual means to selectively connect or disconnect said power unit from said crank mechanism.

WILLIAM H. RICHARDS.

REFERENCES CITED

The following references are of record in the file of this patent:

UNITED STATES PATENTS

| Number | Name | Date |
|---|---|---|
| 1,013,033 | Marquis | Dec. 26, 1911 |
| 1,044,028 | Curtiss | Nov. 12, 1912 |
| 1,200,753 | Neff | Oct. 10, 1916 |
| 1,429,723 | Eason | Sept. 19, 1922 |
| 1,598,756 | Troland | Sept. 7, 1926 |
| 1,711,333 | Swenson | Apr. 30, 1929 |
| 1,738,095 | Carleton | Dec. 3, 1929 |
| 1,828,364 | Garbutt | Oct. 20, 1931 |
| 1,981,406 | Young | Nov. 20, 1934 |
| 2,047,474 | Howell | July 14, 1936 |
| 2,144,088 | Scott | Jan. 17, 1939 |
| 2,206,333 | Robertson | July 2, 1940 |
| 2,291,613 | Dye | Aug. 4, 1942 |
| 2,331,451 | Blaney | Oct. 12, 1943 |
| 2,349,999 | Urbach | May 30, 1944 |
| 2,380,962 | Garraway | Aug. 7, 1945 |
| 2,413,218 | Coroniti | Dec. 24, 1946 |